UNITED STATES PATENT OFFICE.

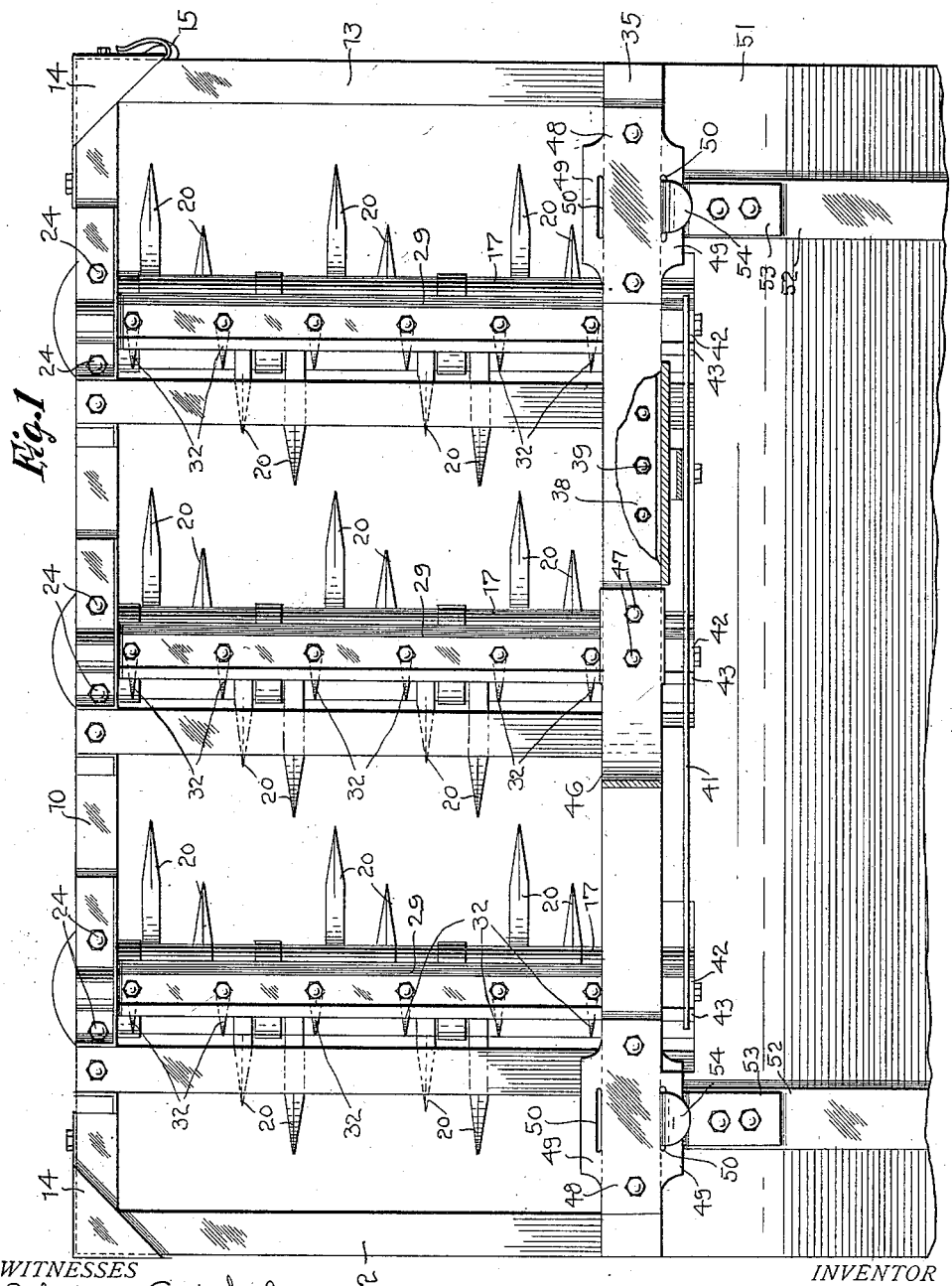

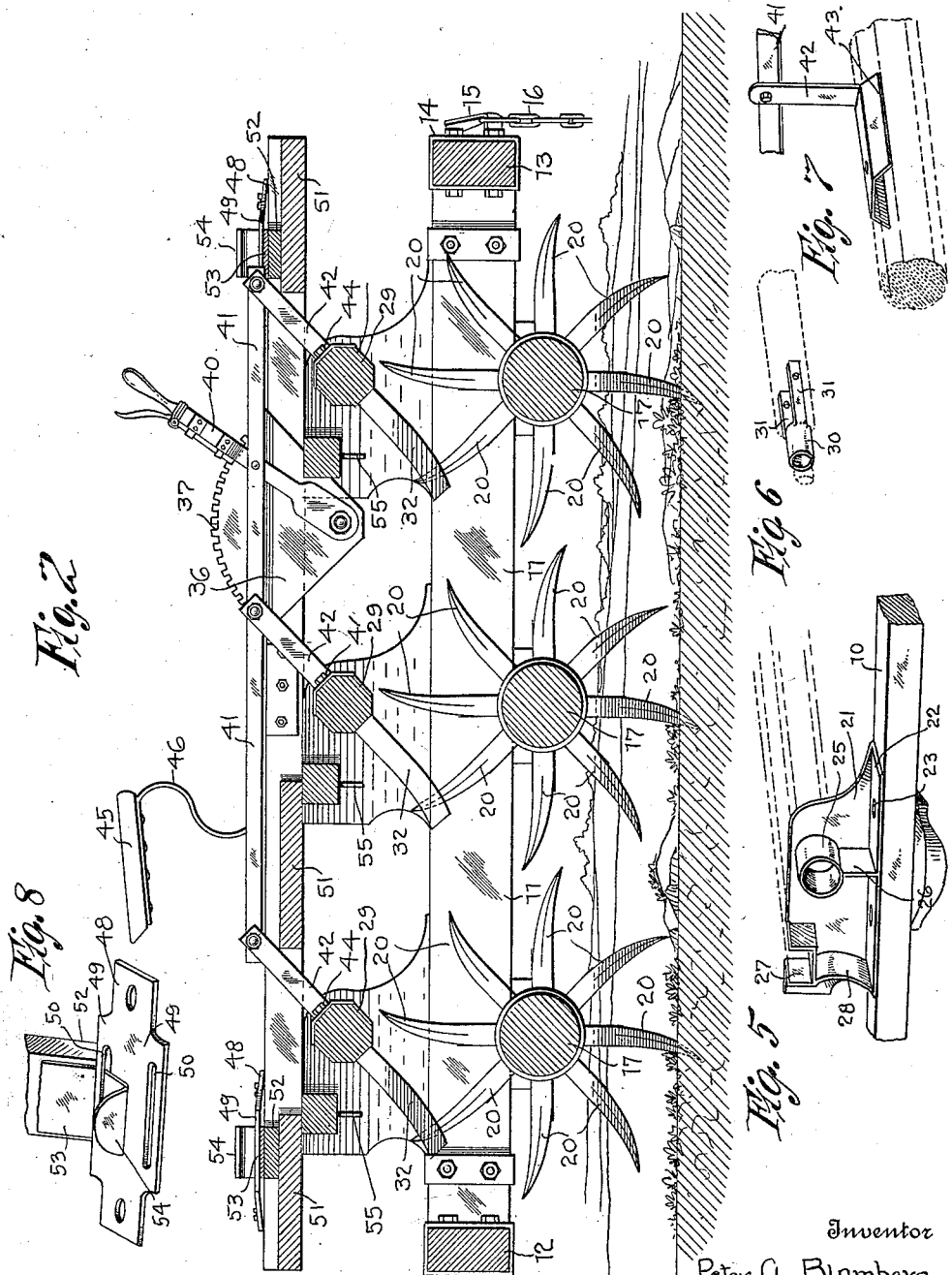

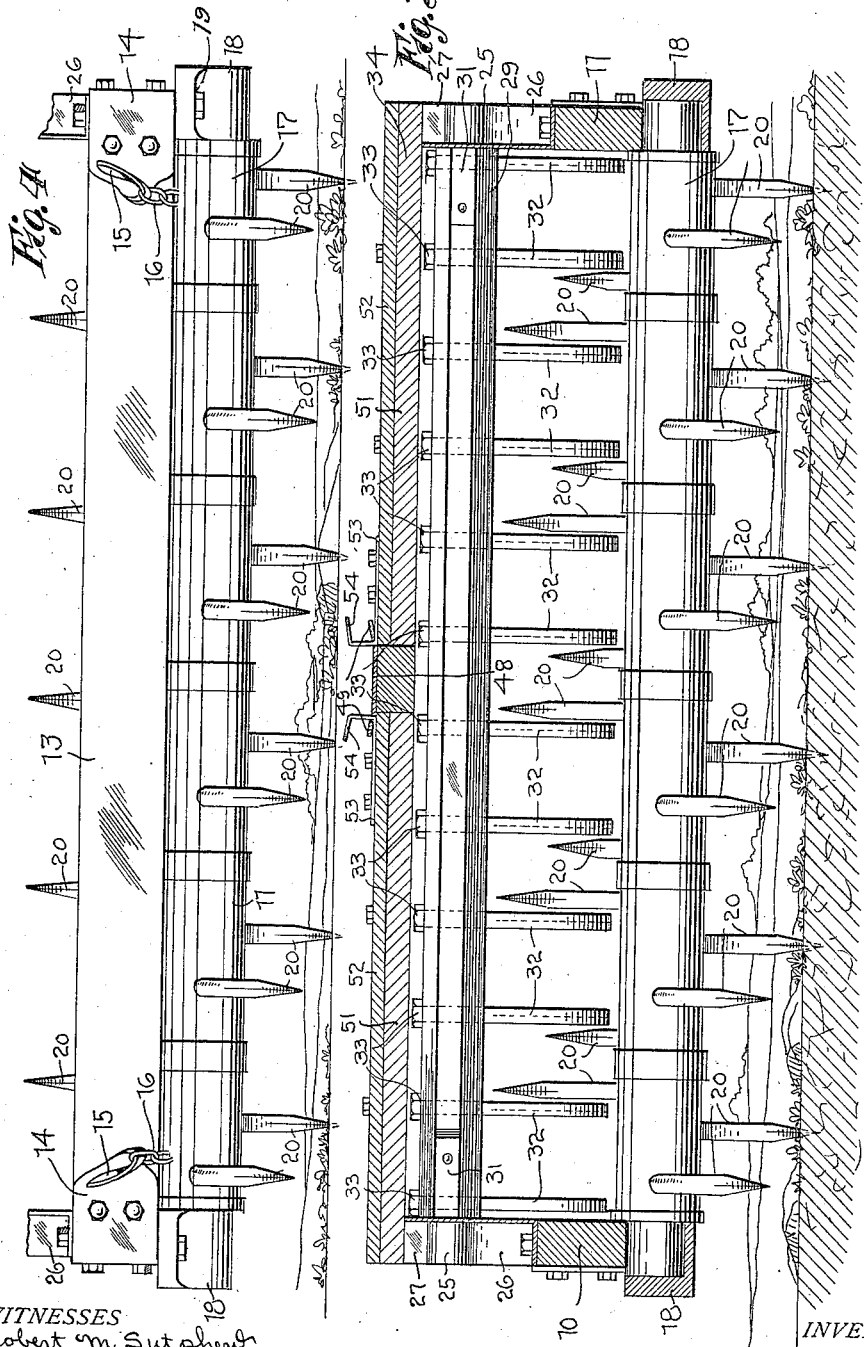

PETER A. BLOMBERG, OF JESSE LAKE, MINNESOTA.

ROTARY HARROW.

1,045,250.  Specification of Letters Patent.  Patented Nov. 26, 1912.

Application filed November 13, 1911. Serial No. 660,125.

*To all whom it may concern:*

Be it known that I, PETER A. BLOMBERG, a citizen of the United States, residing at Jesse Lake, in the county of Itasca and State of Minnesota, have invented certain new and useful Improvements in Rotary Harrows, of which the following is a specification, reference being had therein to the accompanying drawing.
This invention relates to harrows and the principal object of the same is to provide a harrow which will not throw the soil into ridges and which will not clog, there being provided an apparatus for cleaning the teeth of the harrow whenever necessary.

This harrow will also cut pieces of sod or large lumps of hard soil and therefore provides a better seed bed than the harrows which are liable to ride over the pieces of sod and large lumps of dirt.

This improved harrow is also provided with covers which are removably connected with the frame so that when it is desired to repair any of the parts of the harrow beneath the covers easy access may be had to the same. It should also be noted that the portion of the frame which carries the covers may be removed as will be brought out in the specification.
This invention is illustrated in the accompanying drawings, wherein:

Figure 1 is a top plan view of one side of the harrow with the cover removed. Fig. 2 is a longitudinal section view through the harrow taken in the central part of the machine. Fig. 3 is a transverse section through the harrow. Fig. 4 is a front elevation of the lower portion of the harrow. Fig. 5 is an enlarged perspective view of that portion of the frame carrying one of the brackets which supports the cleaning knives and cover supporting frame. Fig. 6 is a perspective view of one of the brackets which carry the shafts having the cleaning knives mounted therein, the shaft being indicated by dotted lines. Fig. 7 is a perspective view of one of the arms which connect the knife carrying shafts with the operating bar. Fig. 8 is a perspective view of one of the plates having the hinge of one of the covers connected therewith.

Referring to the accompanying drawings by numerals it will be seen that this harrow comprises a base frame having the side bars 10 and 11 and the end bars 12 and 13. These bars are connected together to form a rectangular frame the corners of which are braced by the plates 14. The forward plates are provided with tongues 15 which are bent to form hooks with which a draft chain 16 is connected. A number of transversely extending shafts 17 are mounted in the journals 18 which are secured to the lower edges of the side bars 10 and 11 by means of screws which pass through the openings 19 formed in the journals. It will, of course, be obvious that bolts or other securing means could be used in place of the screws. These shafts each carry a number of curved teeth 20 which cut the plowed dirt and break it up into small pieces. It should be noted that these teeth are curved as shown in Fig. 2 so that when in operation the teeth engage the dirt and breaks it up instead of pushing it along in front of the shafts as might be the case if the teeth were curved in the opposite direction. A number of oppositely disposed supporting brackets are mounted upon the side bars 10 and 11 above the journals 18, the same number of brackets and journals being used. Each bracket comprises a vertical plate 21 which has a base flange 22 provided with openings 23 through which securing bolts 24 are passed. A sleeve 25 extends outwardly from the plate 21 and is braced by means of the web 26. This sleeve 25 forms a bearing for one end of a shaft which carries the cleaning knives. A rectangular socket 27 is formed adjacent the rear end of the bracket and is braced by the curved web 28 and is adapted to receive one end of a bar which forms part of the cover supporting frame. Shafts 29 extend above the shafts 17 and are rotatably mounted in the sleeves 25. The shafts are each provided with a bearing sleeve 30 which fits upon the reduced end mounted in the sleeve 25 and is secured to the shaft by means of arms 31 extending along the shaft. Cleaning knives 32 pass through the shafts 29 and are secured in place by means of the nuts 33. These knives are positioned so that they pass between the teeth 20 when brought into an operative position as shown in Fig. 3 and are adapted to remove the dirt which is wedged between the teeth or is stuck to the teeth. Bars 34 extend parallel to the shafts 29 and are mounted in the bearings 27 of the brackets and are connected by a longitudinally extending bar 35 which is centrally located upon the machine. A plate 36 having a rack 37 formed in its upper edge is secured to the bar 35 by means of the plate 38, a screw 39 passing through the plate into the bar 39. A latch lever 40 is pivotally mounted upon the plate 36 and carries a longitudinally extending strip 41 which is pivotally mounted upon the lever and which is pivotally connected with the arms 42 that extend from the plates 43 which are secured to the shafts 29 by means of the screws 44. It will thus be seen that by rocking the lever the shafts 29 may be turned in their bearings to bring the cleaning knives into and out of engagement with the teeth. A seat 45 has its spring support 46 secured to the bar 35 by means of the bolts 47. Plates 48 are secured near the ends of the bar 35 and are provided with upwardly inclined side extensions 49 which are provided with the longitudinally extending slots 50. These extensions form hinge ears so that the removable covers may be connected with the bar 35. The covers 51 are provided with transversely extending strips 52 at the inner ends of which are mounted the metallic strips 53 having their end portions bent to form hooks 54 which pass through the slots 50 and thus pivotally connect the bars with the plates 48. Pins 55 are mounted in the bars 34 and prevent transverse movement of the bars.

When using this device a draft animal is connected with the chain 16 and the machine is drawn over the plowed ground, and the shafts 17 are turned thus bringing the teeth 20 into contact with the dirt and thereby cutting up the lumps. If dirt becomes clogged between the teeth or gets stuck upon the teeth the lever 40 is rocked by the person riding upon the harrow in order to bring the knives 32 to the position shown in Fig. 3 thus causing the teeth to pass between the knives, thereby removing all of the dirt.

If it is desired to repair any part of the machine the covers may be removed and easy access may be had to the portions of the machine beneath the covers. If desired the screw 39 and the bolts which hold the ends of the bars 34 in the bearings 27 are removed and the entire cover carrying frame can be removed from the brackets. It will thus be seen that there has been provided a harrow which may be readily taken apart when it is desired to repair or replace any of the parts and there is also provided a harrow which will cut up sod and large lumps of dirt the teeth of which may very easily be cleaned if dirt becomes clogged between them.

What I claim is:—

1. A harrow comprising a tooth carrying frame, a cleaner carrying frame removably connected with said tooth carrying frame, means for bringing the cleaners of said cleaner carrying frame into and out of operative position, and covers removably connected with said cleaner carrying frame.

2. A harrow comprising a base frame, tooth carrying shafts rotatably connected with said base frame, brackets carried by said base frame, shafts pivotally connected with said brackets, knives carried by said shafts, a cover supporting frame carried by said brackets, means for moving said knife carrying shafts to bring said knives into and out of operative position, and covers removably connected with said cover supporting frame.

3. A harrow comprising a base frame, rotary tooth carrying shafts connected with said frame, brackets mounted upon said frame, cross bars carried by said brackets, a longitudinally extending bar connecting said cross bars, cleaning means carried by said brackets, means carried by said longitudinally extending bar for bringing said cleaning means into and out of operative position, and covers connected with said longitudinally extending bar.

4. A harrow comprising a base frame, tooth carrying shafts rotatably connected with said frame, brackets mounted upon said frame, each comprising a vertical plate having a securing flange at its lower edge and provided with an outstanding bearing sleeve adjacent its upper edge, a web positioned between said sleeve and flange to brace said sleeve, an outstanding socket adjacent said sleeve, a curved web positioned between said socket and flange to brace said socket, knife carrying shafts pivotally mounted in said sleeves, transversely extending bars mounted in said sockets, a longitudinally extending bar connecting said transverse bars, operating means mounted upon said longitudinally extending bar and connected with said knife carrying shafts, and covers connected with said longitudinally extending bar.

5. A harrow comprising a base frame, tooth carrying shafts carried by said frame, brackets mounted upon said frame, knife carrying shafts having reduced ends passing through said brackets, sleeves surrounding the reduced ends of said knife carrying shafts and provided with arms extending longitudinally of said knife carrying shafts, an upper frame carried by said brackets, and operating means mounted upon said upper frame and connected with said knife carrying shafts.

6. A harrow comprising a base frame, tooth carrying shafts rotatably carried by said base frame, brackets mounted upon said base frame, transverse bars carried by said brackets, a longitudinally extending bar connecting said transverse bars, plates mounted upon said longitudinal bar and having upturned side extensions provided with slots, covers resting upon said transverse bars, and strips secured to said cover and having their free ends formed into hooks adapted to pass through said slots to hinge said covers.

7. A harrow comprising a base frame, tooth carrying rollers carried by said base frame, brackets carried by said frame, cross bars carried by said brackets, depending pins positioned adjacent the ends of said cross bars to prevent movement of said bars, a longitudinally extending bar carried by said cross bars, and covers connected with said longitudinally extending bar.

8. A harrow comprising a base frame, tooth carrying shafts carried by said frame, brackets mounted upon said frame, cleaner carrying shafts mounted in said brackets, sleeves surrounding the ends of said cleaner carrying shafts and provided with arms extending along said cleaner carrying shafts, an upper frame carried by said brackets, and operating means thereon for said cleaner carrying shafts.

9. In a harrow, brackets each comprising a vertical plate having a securing flange at its lower edge and provided with an outwardly extending bearing sleeve, a web positioned between said sleeve and flange to brace said sleeve, an outstanding socket adjacent said sleeve, and a curved web positioned between said socket and flange to brace said socket.

10. A harrow comprising a base frame, harrow teeth carried by said base frame, brackets mounted upon said base frame, bars carried by said brackets, a bar connecting said first mentioned bars, plates mounted upon said bar and provided with slots, covers resting upon said first mentioned bars, and strips secured to said covers and having their free ends formed into hooks adapted to pass through said slots to hinge said covers.

11. A harrow comprising a tooth carrying frame, cleaner carrying means carried by said tooth carrying frame, a cover carrying frame removably connected with said cleaner carrying means, and means carried by said cover carrying means for bringing the cleaners carried by said cleaner carrying means into and out of operative position.

In testimony whereof I hereunto affix my signature in presence of two witnesses.

PETER A. BLOMBERG.

Witnesses:
E. G. PIFHER,
PETER PETERSON.

---

Copies of this patent may be obtained for five cents each, by addressing the "Commissioner of Patents, Washington, D. C."